US008867780B2

(12) United States Patent
Hodge et al.

(10) Patent No.: US 8,867,780 B2
(45) Date of Patent: Oct. 21, 2014

(54) OBFUSCATING THE DISPLAY OF INFORMATION AND REMOVING THE OBFUSCATION USING A FILTER

(75) Inventors: Andrew Hodge, Palo Alto, CA (US); Gloria Lin, San Ramon, CA (US); Tyler Mincey, Pacifica, CA (US); Benjamin Rottler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 955 days.

(21) Appl. No.: 12/712,999

(22) Filed: Feb. 25, 2010

(65) Prior Publication Data

US 2011/0206285 A1 Aug. 25, 2011

(51) Int. Cl.
*G06K 9/00* (2006.01)
*G06F 21/84* (2013.01)
*G09G 3/32* (2006.01)
*G09G 3/36* (2006.01)
*G09G 5/02* (2006.01)

(52) U.S. Cl.
CPC .............. *G06F 21/84* (2013.01); *G09G 3/3208* (2013.01); *G09G 3/3651* (2013.01); *G09G 5/02* (2013.01); *G06F 2221/2107* (2013.01); *G09G 2320/068* (2013.01)
USPC ........................................................ 382/100

(58) Field of Classification Search
None
See application file for complete search history.

(56) References Cited

U.S. PATENT DOCUMENTS

| | | | |
|---|---|---|---|
| 4,879,603 A * | 11/1989 | Berman | 348/832 |
| 5,619,219 A * | 4/1997 | Coteus et al. | 345/7 |
| 5,963,371 A * | 10/1999 | Needham et al. | 359/464 |
| 6,252,570 B1 * | 6/2001 | Mangerson | 345/87 |
| 6,529,209 B1 * | 3/2003 | Dunn et al. | 345/629 |
| 6,597,328 B1 * | 7/2003 | Stern et al. | 345/9 |
| 6,959,389 B1 * | 10/2005 | Dunn et al. | 713/183 |
| 7,076,082 B2 * | 7/2006 | Sharma | 382/100 |
| 7,199,767 B2 | 4/2007 | Spero | |
| 7,209,557 B2 * | 4/2007 | Lahiri | 380/54 |
| 7,319,755 B2 * | 1/2008 | Struyk | 380/213 |
| 7,978,929 B2 * | 7/2011 | Kim et al. | 382/284 |
| 8,150,034 B2 * | 4/2012 | Hogl | 380/208 |
| 8,213,675 B2 * | 7/2012 | Kim et al. | 382/100 |
| 8,238,692 B2 * | 8/2012 | Kim et al. | 382/284 |
| 2002/0158967 A1 * | 10/2002 | Janick et al. | 348/87 |
| 2002/0159026 A1 | 10/2002 | Bernheim | |
| 2003/0026449 A1 * | 2/2003 | Yerazunis et al. | 382/100 |
| 2003/0072468 A1 * | 4/2003 | Brunk et al. | 382/100 |
| 2003/0108198 A1 * | 6/2003 | Lahiri | 380/54 |
| 2003/0118183 A1 * | 6/2003 | Struyk | 380/213 |
| 2003/0133569 A1 * | 7/2003 | Stern et al. | 380/206 |
| 2003/0169213 A1 * | 9/2003 | Spero | 345/7 |
| 2004/0208394 A1 * | 10/2004 | Kurata | 382/275 |
| 2006/0221067 A1 * | 10/2006 | Kim et al. | 345/204 |
| 2008/0239452 A1 | 10/2008 | Xu et al. | |
| 2008/0310018 A1 * | 12/2008 | Tripp | 359/483 |
| 2009/0059103 A1 * | 3/2009 | Azor et al. | 349/8 |
| 2009/0067627 A1 * | 3/2009 | Hogl | 380/243 |

(Continued)

*Primary Examiner* — Avinash J Yentrapati (57) ABSTRACT

This is directed to obfuscating a display to secure the display of information provided to a user. An electronic device can modulate the display of information using different approaches, including for example by adding artifacts or changing the color, frequency or polarity of displayed information, thus obfuscating the display. To view the displayed information, a user can place a filter between the user and the display (e.g., as part of glasses) such that the filter can remove or undo the obfuscation. In some embodiments, the device can display different confidential information for several users simultaneously, where different obfuscation approaches are used for each user. This can allow several users to interact with the device simultaneously while ensuring that each user's information remains confidential.

15 Claims, 8 Drawing Sheets

(56) References Cited

U.S. PATENT DOCUMENTS

2010/0066819 A1* 3/2010 Yu et al. .......................... 348/53
2010/0245563 A1* 9/2010 Golovchinsky et al. ...... 348/135
2011/0114716 A1* 5/2011 Pratt ............................. 235/375

* cited by examiner

OBFUSCATING THE DISPLAY OF INFORMATION AND REMOVING THE OBFUSCATION USING A FILTER

BACKGROUND OF THE INVENTION

This is directed to systems and methods for adjusting the manner in which information is provided by a display such that only an authorized user having an appropriate filter can view the displayed information. In some embodiments, this is directed to simultaneously displaying different sets of information such that the different users can simultaneously and independently view different sets of information.

Many electronic devices, including portable electronic devices, can include displays for providing information to users. The electronic device can include any suitable type of display, including for example a LED, LCD, OLED, plasma, projector, e-ink, or combinations of these types of display. Any suitable information can be provided on the display. For example, one or more of text, graphics and media can be provided on the display for the user. Any suitable application or process of the device can generate the information to be provided on the display. For example, one or more media applications, text generation applications, photo applications, communications application, web browsing applications, or combinations of these can provide information for the display.

In some embodiment, the display can have a large viewing angle so that a user can view the information from positions other than straight ahead. While this may allow users to easily view displayed information, the information can also be visible to other people in the user's environment. When a user is displaying confidential or personal information, however, a user may not wish that the information be easily visible to all. To prevent this, some users can place plastic screen over the display, where the screen reduces the viewing angle of the display to a very narrow angle substantially perpendicular to the display. This approach, however, does not prevent other people behind the user (e.g., within the narrow viewing angle) from viewing the information displayed by the device. In addition, the screen can greatly reduce the amount of light reaching the user from the display, and therefore decrease the user's experience, and may force the user to sit directly opposite the display.

SUMMARY OF THE INVENTION

This is directed to systems and methods for changing the manner in which information is provided on a display so that only a single authorized user can view the information when it is displayed. In particular, this is directed to providing a display that obscures or obfuscates information such that only a user with a corresponding filter (e.g., in glasses) can see the un-obscured information.

An electronic device can include a display operative to provide information to a user. In some cases, a user may direct the electronic device to display confidential or private information. To prevent unauthorized users to view the information, for example over the authorized user's shoulder, the electronic device can obfuscate the display of the information in one or more regions of the device. For example, the electronic device can add artifacts to the display to obscure portions of the displayed information. As another example, the electronic device can adjust display properties of the information (e.g., color or polarity) such that the information appears obscured. In some embodiments, the electronic device can apply a reversible transformation to the displayed information.

To view the obfuscated information, the user can place a filter between the device display and the user's eyes. The filter can correspond to the particular obfuscation approach used for securing the display of the information. In some embodiments, the filter can be static, such that only a fixed set of obfuscation processes work with the filter. Alternatively, the filter can be dynamic such that it can adjust the manner in which it filters based on the obfuscation process used by the electronic device. In some cases, a dynamic filter can be used to reverse a transformation applied to displayed information.

The electronic device can determine which obfuscation process to use using any suitable approach. In some embodiments, the electronic device can identify a user or a filter, and select an obfuscation process that corresponds to the user or filter. For example, the electronic device can capture an image of a filter, and determine attributes of the filter from the image. As another example, the electronic device can receive from the filter an obfuscation process to use. As still another example, the filter can receive from the electronic device a reverse transformation to apply to displayed information.

In some embodiments, the electronic device can instead or in addition adjust the viewing angle of regions of the display. The viewing angle for each region can be oriented away from the center of the of the device, and in some cases can change dynamically to follow a user's position relative to the display (e.g., follow the user's head). In some embodiments, several regions can each be associated with several viewing angles so that different users can simultaneously view different information privately on the display.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to varying the manner in which information is provided on a display to ensure that only authorized users can see displayed information. In some embodiments, the device can require the user to view the display using a filter (e.g., in glasses).

An electronic device can include a display for providing information to a user. Any suitable information can be provided by the display, including for example information that may be private or confidential for the user. To prevent unauthorized viewing of the confidential information, the display of the information can be secured instead of or in addition to securing the access the information in the device (e.g., secure the manner in which the information is displayed, as opposed to whether or not a user has provided a correct password for accessing the information).

The display of information can be secured using any suitable approach. In one embodiment, the display can be obscured or obfuscated in a manner such that only a user having a filter to separate the information provided by the device from noise can view the information. For example, the electronic device can adjust one or more of the frequency of the display, colors, refresh rate, apply a transformation, add artifacts, or combinations of these. In some embodiments, the mechanism used to obscure information can vary over time to further avoid unauthorized discovery of the content.

The user can use the filter using any suitable approach. In some embodiments, the filter can be integrated in glasses or goggles used by the user. For example, a user can associate a particular pair of secure glasses with the device, and direct the device to obscure displayed information in a manner that corresponds to attributes of the particular pair of secure glasses. The filter can separate the information provided by the device from noise using any suitable approach. In some embodiments, the filter can include an optical treatment that corresponds to the method of obfuscating used by the device. Alternatively or in addition, the filter can include a dynamic element that can capture an image provided by the display, and apply a reverse transformation to provide the information to the user.

The electronic device can secure the display of information at any suitable time. For example, all information provided by the display can be obfuscated for security. As another example, the electronic device can determine when a user has a filter, and obfuscate displayed information in response to detecting the filter (e.g., obfuscate in a manner that corresponds to the filter). As still another example, a user can direct the device to obfuscate information (e.g., toggle a switch for securing the display of information).

Figure 1:
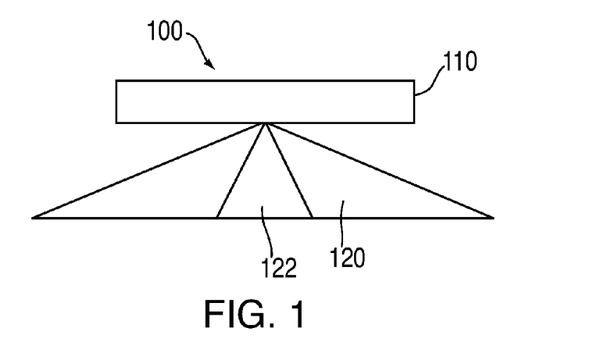
FIG. 1 is a schematic view of an illustrative display device in accordance with one embodiment of the invention.

FIG. 1 is a schematic view of an illustrative display device in accordance with one embodiment of the invention. Display 110 can be incorporated as part of any electronic device, or can be connected to an electronic device providing information to display. Display 110 can include any suitable type of display, including for example LED, LCD, OLED, plasma, projector, e-ink, or combinations of these technologies. Display 110 can have any suitable viewing angle, including for example wide viewing angle 120 (e.g., in the range of 120 degrees to 170 degrees) or narrow viewing angle 120 (e.g., in the range of 15 degrees to 45 degrees). A wide viewing angle can permit a user to understand and use the display while positioned at an angle relative to the display, and may therefore be a desirable feature for the display. The wide viewing angle, however, may allow other people in the vicinity of the display to view the information provided on the display.

To reduce the number of unauthorized people that can view the display, the display can instead have a reduced viewing angle. The reduced viewing angle can be oriented in any suitable manner relative to the display. For example, the reduced viewing angle can be aligned substantially perpendicular to the display (e.g., as shown by viewing angle 122). As another example, the reduced viewing angle can be oriented at an angle relative to vertical (e.g., towards the right or left of the display). These approaches, however, can limit the manner in which an authorized user can interact with the device.

Figure 2A:
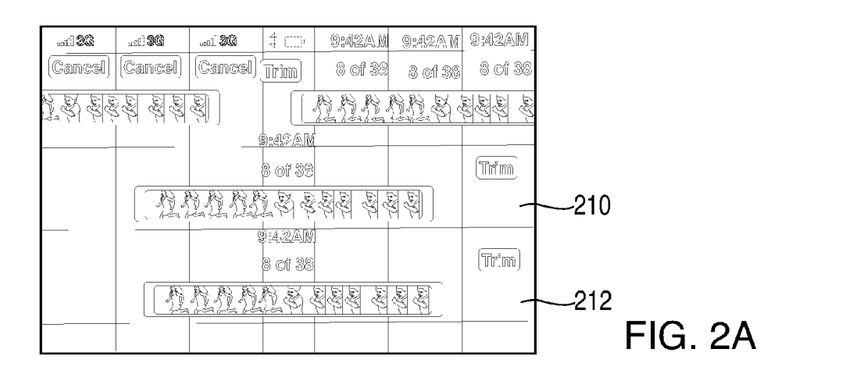
FIG. 2A is a schematic view of an obfuscated electronic device display in accordance with one embodiment of the invention.
Figure 2B:
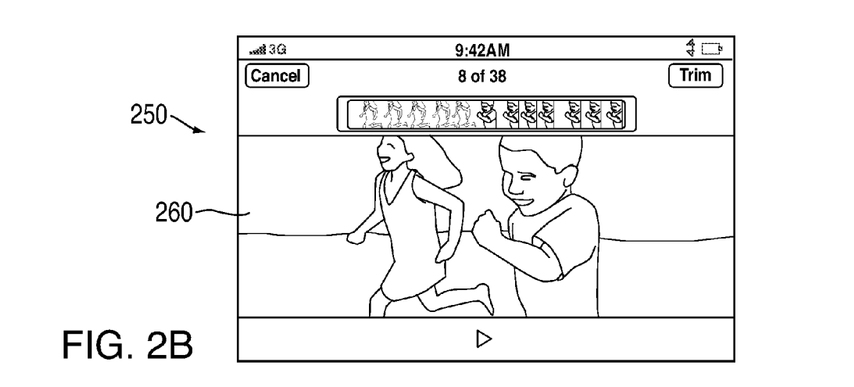
FIG. 2B is a schematic view of the electronic device display of FIG. 2A when the obfuscation is removed in accordance with one embodiment of the invention.

To provide a secure display of information without requiring the user to be positioned relative to the display in a particular manner (e.g., within a small viewing angle), the electronic device can obfuscate the display of information such that only an authorized user placing a filter between the display and the user's eyes can remove the obfuscation and see the displayed information. FIG. 2A is a schematic view of an obfuscated electronic device display in accordance with one embodiment of the invention. FIG. 2B is a schematic view of the electronic device display of FIG. 2A when the obfuscation is removed in accordance with one embodiment of the invention. Display 200 can be provided by any suitable electronic device, including for example a portable or static electronic device. Display 200 can include content or information 210 provided in a display area. To prevent unauthorized viewers from viewing information 210, display 210 can include obfuscation 212. When obfuscation 212 is removed, information 260 may be visible to the user. Obfuscation 212 can take any suitable form, including for example using one or more of modulating frequency or color, polarization, applying a reversible transformation, adding removable artifacts, or combinations of these.

The electronic device can obfuscated displayed content using any suitable approach. In some embodiments, the electronic device can add artifacts or noise to displayed information. The noise can be modulated on the display using any suitable approach, including for example time-based, color-based, and polarization-based approaches. For example, the electronic device can display noise and desired information at a high rate, such that the resulting display is obfuscated. Using a filter timed with the rate at which information is displayed, a user can direct the filter to become opaque when noise is displayed, but transparent or translucent when desired information is displayed. As another example, the electronic device can add artifacts of a particular color or in polarized in a particular manner to information of interest to the user, such that the artifacts cause the information to become obfuscated. A user can use a colored or polarized filter corresponding to the artifacts to remove the artifacts and reveal the information. In some embodiments, the electronic device can instead or in addition apply a transformation (e.g., rotating, stretching and reflecting) the image. The filter can reverse the transformation to un-obfuscate the display.

Figure 3:
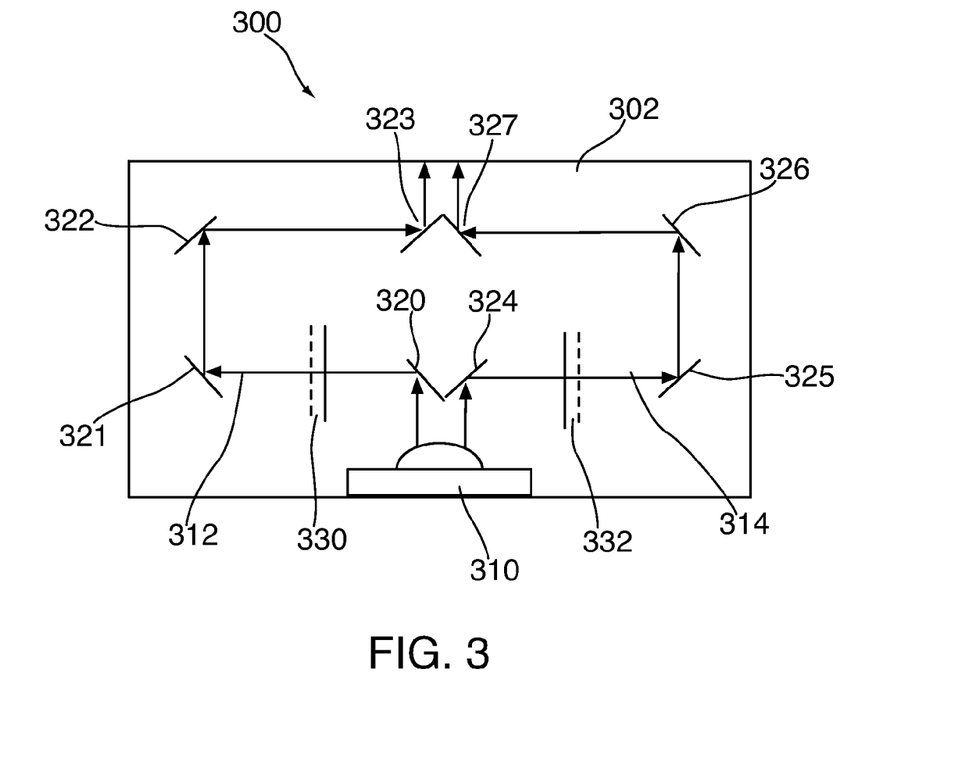
FIG. 3 is a schematic view of a display system in which displayed images are polarized in accordance with one embodiment of the invention.

In one implementation, the electronic device can obfuscate displayed information by polarizing the images provided by the display. FIG. 3 is a schematic view of a display system in which displayed images are polarized in accordance with one embodiment of the invention. System 300 can include display 302 providing a signal corresponding to information to be displayed. In particular, system 300 can include image source 310. In some embodiments, system 300 can include several images sources 310 (e.g., LEDs) distributed within display 302. The number and type of images sources 310 can be selected based on any suitable criteria, including for example a resolution, screen size, display type (e.g., LCD, LED, OLED, or plasma).

Each image source 310 can output light as waves 312 and 314. To secure the information displayed by display 300, the display can selectively direct light waves 312 and 314 emitted by image source 310 through one of optical components 330 and 332. In one implementation, optical component 330 can include a polarizer that polarizes light passing through the optical component at 90 degrees, while optical component 332 can include a polarizer that polarizes light passing through the optical component at 0 degrees (e.g., out of phase with the light passing through optical component 330). In some embodiments optical components 330 and 332 can adjust other properties of the light waves (e.g., colors).

Display 302 can selectively direct light waves through optical components 330 and 332 using any suitable approach. In some embodiments, display 302 can include sequence 320, 321, 322 and 323 of reflective elements, and sequence 324, 325, 326 and 327 of reflective elements. Each sequence of reflective elements can direct light emitted by image source 310 through one of optical components 330 and 332, and to an external surface of display 302. Each sequence of reflective elements can include any suitable number of reflective elements, including for example a number in the range of 1 to 10. For example, the sequence can include an even number of reflective elements such that the light forming an image emitted by image source 310 is not reversed or inverted when it reaches an outer surface of display 302. Alternatively, image source 310 can initially emit a reversed or inverted image that is reflected by an odd number of reflective elements. In some cases, however (e.g., point light sources), the number of reflective elements may not matter. The length of the path traveled by light emitted by image source 310 along each sequence of reflective elements (e.g., sequences 320, 321, 322, and 323; and sequences 324, 325, 326 and 327) can be selected using any suitable approach. For example, each path can have the same length so that light emitted by image source 310 and passing through the optical components can reach an outer surface of display 302 at the same rate as image source 310 outputs the light. Alternatively, the path lengths can be different but selected to ensure that images output by image source 310 reach an outer surface of display 302 at different times (e.g., to avoid overlapping images). In some embodiments, however, it may be desirable to have images passing through different optical components reach an outer surface of the display at the same time so that the images can overlap and distort the content appearing on the display. Using appropriate filters (e.g., associated with particular optical components), however, a user can distinguish one or both of the images.

In some embodiments, some of the reflective elements can be shared to direct light through one or both of optical components 330 and 332. The reflective elements can be constructed from any suitable material, including for example a material providing specular reflection or diffuse reflection (e.g., glass, polished metal, or plastic having an optical treatment). The refraction index of the material can be selected such that at least a threshold amount of light is reflected by the sequence of reflective elements and reaches the external surface of display 302. The reflective elements can have any suitable size, including for example a size sufficient to reflect the light for a single pixel (e.g., light from a point light source), light for part of or an entire image, or combinations of these (e.g., in different regions of the display).

Display 302 can selectively direct light emitted by image source 310 through one of optical components 330 and 332 using any suitable approach. In some embodiments, one or both of reflective elements 320 and 324 can selectively direct emitted light through the optical components. For example, the reflective elements can selectively be placed opposite image source 310 to direct the emitted light along one of the sequence of reflective elements. In some embodiments, a single reflective element can be selectively pivoted to direct light along each of the sequences of reflective elements (e.g., reflective element 320 and 324 are two positions of a single element).

In some embodiments, system 300 can instead or in addition include only a single sequence of reflective elements or of no reflective elements, and selectively insert optical component 330 or optical component 332 in the path of light emitted by image source 310. For example, optical component 330 and 332 can be selectively moved in or out of the light emitted by image source 310. The optical components can be moved within the display using any suitable approach, including for example by mounting the optical components in a fixture (e.g., a rail). In some embodiments, this approach can enable system 300 to have more than two optical components (e.g., three or more different optical components).

System 300 can include any suitable number of optical components. For example, system 300 can include at least two optical components, where each optical component provides a different modulation of the output image. The system can enable or use any suitable number of optical components, including for example none, some, or all of the available optical components. For example, if the user does not enable an obfuscation or security feature, system 300 can bypass all optical components. As another example, if only a single user has a filter to remove an obfuscation of an emitted image, system 300 can use only one optical element (e.g., optical element 300) to obfuscate the output image. As still another example, if several users are viewing images simultaneously using the device, system 300 can pass the images through several optical components each associated with the filters of the several users such that each user can view personalized content in a secure manner. In some embodiments, system 300 can direct light to all of the optical components, but only direct light associated with the user's information to one of the optical components—the other optical components can serve to further obfuscate the display.

The light emitted by image source 310 can be directed to pass through each optical component at any suitable time. In some embodiments, display 302 can change the optical component through which emitted light passes based on a rate at which image source 310 provides an output. For example, every other image or light wave output by the image source (e.g., based on the refresh rate of the display or frame rate of the displayed information) can be directed to one of the two optical components. In particular, each frame drawn by display 302 can be directed to one of the optical components in an alternating fashion. System 300 can provide individual frames to each of several optical components at any suitable rate. In one implementation, system 300 can provide individual frames through each optical element at regular intervals, for example directing a frame to each of the optical components in sequence (e.g., such that if there are x optical components, one of every x frames passes through each optical component). This approach can ensure that sufficient frames pass through each optical component to provide a continuous and jitter-free image to the users viewing content passing through each optical component (e.g., based on the persistence of vision of each user). In some embodiments, the frame rate or refresh rate of the system can be increased to ensure that the output image appears sufficiently continuous and does not appear to flicker (e.g., at least 16 frames per second for each optical component).

In some embodiments, system 300 can include several light sources providing images for the display. In particular, each light source can provide light waves modified in different manners (e.g., passing through different optical components) and mixed before reaching an outer surface of the display. For example, system 300 can include, for each pixel of a display, at least two image sources providing light waves. Each light wave can pass through a different polarizer, and subsequently be mixed by passing through a prism. The resulting mixed light wave can be provided to the outer surface of the display (e.g., for the pixel).

Figure 4A:
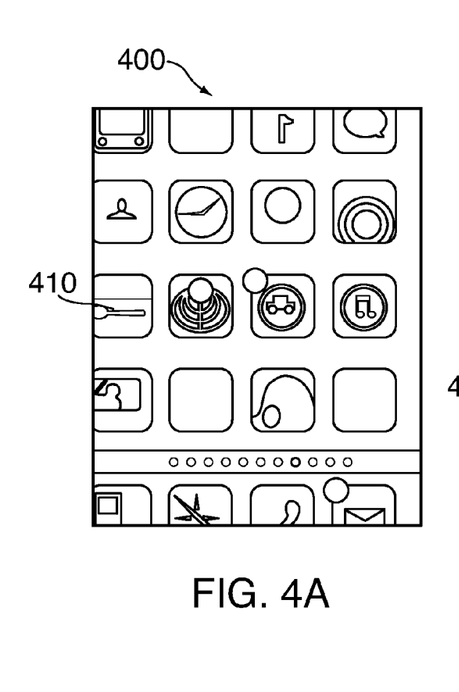
FIG. 4A is a schematic view of an illustrative un-obfuscated display in accordance with one embodiment of the invention.
Figure 4B:
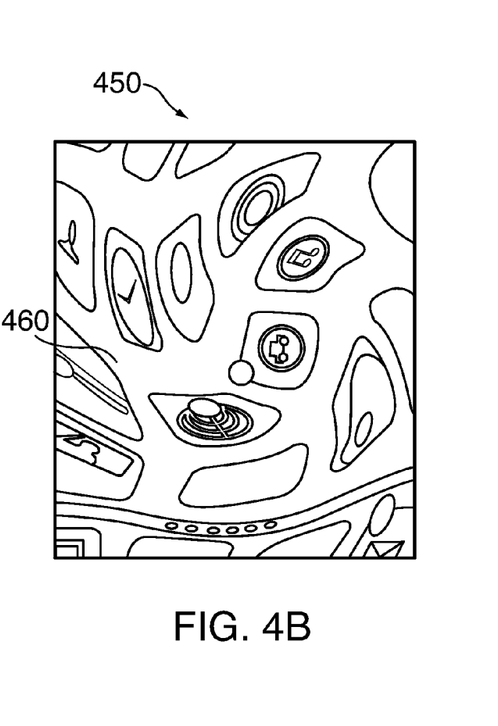
FIG. 4B is a schematic view of the display of FIG. 4A obfuscated by a transformation in accordance with one embodiment of the invention.

In some embodiments, the electronic device providing the information can instead or in addition apply a reversible transformation to the displayed information. FIG. 4A is a schematic view of an illustrative un-obfuscated display in accordance with one embodiment of the invention. FIG. 4B is a schematic view of the display of FIG. 4A obfuscated by a transformation in accordance with one embodiment of the invention. Display 400 can include information 410 provided to a user. To prevent unauthorized viewing of information 410, the electronic device can apply a transformation of the information, resulting in obstructed information 460 in display 450.

The electronic device can apply any suitable reversible transformation to transform information 410 to obstructed information 460. For example, the electronic device can rotate, distort, scale, reflect, shear, or apply combinations of these to information 410. In some embodiments, the electronic device can apply several transformations based on different origins (e.g., rotate around different points). The transformation can be selected based on any suitable criteria, including for example processing capabilities and other available resources of the device (e.g., use a more complex transformation if the processor has sufficient resources and the device has adequate power), the level of security required (e.g., whether the user is in a public location), the type of filter available to the user to remove the transformation, or combinations of these.

The electronic device can apply one or more transformations to the displayed information. In some embodiments, the electronic device can apply a single transformation to the information when the device obfuscates displayed content. For example, the electronic device can identify or select a particular transformation, and apply the transformation to the displayed content. In some embodiments, the electronic device can instead or in addition apply different transformations to the displayed information. For example, the electronic device can vary the transformation based on the current time, the duration since the last transformation was initially applied (e.g., to ensure that the transformation is applied during less than a maximum duration), the information displayed, the user viewing the displayed information, or combinations of these.

When the electronic device provides an obfuscated display, a user may require a filter to remove the obfuscation and view and interact with the underlying information. To operate properly, the user can position the filter between the display and the user's eyes so that portions of the obfuscated information can be removed or adjusted before reaching the user. In particular, the filter can serve to remove obfuscations added by the device, such that the portions of the image passing through the filter include substantially only the un-obfuscated information. In effect, the user may view the filter, and see on a surface of the filter the un-obfuscated information.

Figure 5:
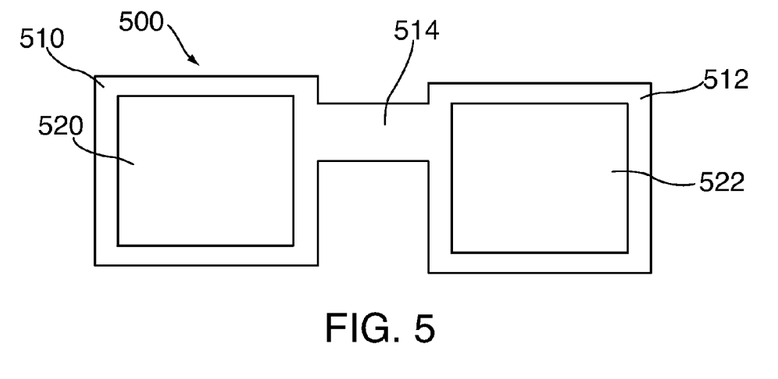
FIG. 5 is a schematic view of an illustrative filter incorporated in glasses in accordance with one embodiment of the invention.

The filter can be provided in any suitable format. For example, the filter can be provided as part of glasses. FIG. 5 is a schematic view of an illustrative filter incorporated in glasses in accordance with one embodiment of the invention. Glasses 500 can include left eyepiece 510 and right eyepiece 512 connected by bridge 514. Eyepieces 510 and 512 can include filter elements 520 and 522, respectively. Filter elements 520 can include the same or different components. For example, filter elements 520 can 522 can both be selected to remove a particular type of obfuscation (e.g., and be the same or different). Alternatively, each filter element can be selected to remove a different type of obfuscation. This approach can be desirable, for example, if displayed information is provided as two offset images providing three-dimensional content (e.g., two obfuscated images are provided simultaneously and obfuscated differently, where the images are offset to correspond to three dimensional content).

The filters can be constructed from any suitable material and can include any suitable treatment to remove obfuscation. For example, the filters can include optical or other treatments to remove particular types of obfuscations (e.g., color-based, frequency based, or polarization-based) on a transparent or translucent material. The treatments can include, for example, coatings (e.g., color or polarized coatings), embedded particles in a material, treatments to the structure of the material (e.g., molecular structure or alignment of material particles), movable optical components (e.g., movable reflectors directing light through different regions of the filter), or combinations of these. The particular treatment selected for a filter can be depend on any suitable criteria, including for example the type of obfuscation used by the device.

In some embodiments, the filter can include a dynamic component. For example, the filter can include or be coupled to circuitry (e.g., as part of glasses 500) operative to adjust the manner in which the filter operates. The circuitry can adjust the un-obfuscation process of the filter, for example by can adjusting the polarity of the filter, or the wavelength of light that is absorbed by the filter. In some embodiments, the circuitry adjusting the molecular structure of the filter. In some embodiments, the circuitry can control reflectors or other mechanical components of the filter that can direct light passing through the filter. In some cases, the circuitry can instead or in addition adjust the transparency or opaqueness of the filter (e.g., alternating between transparent and opaque filters).

In some embodiments, the circuitry can be operative to undo a transformation of obfuscated information. For example, a dynamic filter can identify the particular transformation applied to the information and apply the inverse transformation. Alternatively, the dynamic filter may be operative to automatically apply one or more inverse transformations independent of the electronic device providing the obfuscated information. Such a filter can include, for example, a camera or other capturing component for receiving the information provided by the electronic device, and a display on which to provide the un-obfuscated information. In some embodiments, the material of the filter can instead or in addition be dynamically modified to reverse the transformation (e.g., modify the refraction and absorption of the filter material at specific points to redirect light from the electronic device corresponding to the obfuscated information to a non-obfuscated configuration).

The dynamic component can determine the particular process to apply to remove the obfuscation of the information using any suitable approach. In some embodiments, several processes can be available for a particular filter. Alternatively, a particular filter support (e.g., for a particular set of glasses) can support several different filters, and can provide information for a user to select an appropriate filter. Using a first approach, the electronic device can provide information identifying the particular obfuscation process used for the displayed information. For example, the electronic device can identify a particular polarization used by display circuitry of the device. As another example, the electronic device can identify the color of additional elements added to the display. As still another example, the electronic device can identify a particular transformation applied to displayed information (e.g., identify the transformation steps, or provide a code corresponding to a particular transformation). As yet still another example, the electronic device can identify a rate at which the transparency of the filter is to vary (e.g., in a time-based modulation of the displayed information). The filter can, from the identified obfuscation process, dynamically adjust the process used to remove the obfuscation. Alternatively, a user can select a particular filter corresponding to the identified obfuscation process to use (e.g., as part of glasses 500).

In another approach, the electronic device can provide information identifying a particular process to use to remove the obfuscation of the displayed information. For example, the electronic device can specify a particular treatment or coating required on a material for it to operate as a filter. As another example, the electronic device can identify a particular inverse transformation to apply to the displayed information (e.g., identify the inverse transformation steps, or provide a code corresponding to a particular inverse transformation). A user can then select a filter having the identified treatment, or the filter can dynamically adjust the un-obfuscation process to provide the secured information to the user.

In still another approach, the electronic device can select the particular obfuscation process used based on the capabilities and attributes of filters available to the user. For example, the electronic device can identify a current user, and retrieve from storage a listing of filters known to be associated with the user. As another example, the electronic device can detect the presence of one or more filters, and determine the properties of the filters (e.g., using a camera, RFID tag, NFC protocol, or combinations of these). The electronic device can then select an obfuscation process that corresponds to one or more of the filters.

To ensure that an unauthorized user does not take control of the electronic device and direct it to provide confidential information using a filter that is not associated with the authorized user of the device (e.g., in effect locking out the authorized user), the electronic device can initially require authentication information. In some embodiments, the electronic device can require a user to authenticate (e.g., provide a user name and a password) and identify a particular filter to use.

Once a user has been authenticated, the electronic device and the identified filter can communicate and share information required for un-obfuscating the device display using the filter. In some embodiments, the electronic device can instead or in addition obfuscate information using a process that is associated with one of the filters associated with the user without sharing information with a detected filter.

In some embodiments, the electronic device can instead or in addition first identify the properties of a filter, and subsequently display information associated with a user to which the identified filter properties relate using an obfuscation process that can be removed by the identified filter. This approach can allow the device to securely provide confidential information to each user as the user approaches the device without requiring a separate authentication step—the properties of the filter associated by each user serves to authenticate and secure the display of information by the device.

The electronic device can require an initial setup for associating a user with a particular filter or with particular properties or attributes of a filter (e.g., the un-obfuscating capabilities of a filter). For example, a user can provide authentication information, and provide information identifying one or more filters to associate with the authentication information. If a user does not have or does not know the particular attributes of a filter, the user can direct the device to attempt several obfuscation techniques, and provide an input indicating whether the filter is effective to un-obfuscate the particular technique used. This trial and error approach can be continued until one or more suitable techniques (e.g., techniques that obfuscate information but are un-obfuscated by the filter) are discovered.

In some embodiments, the electronic device can include a camera or other sensor for capturing attributes of a user's environment that can be used to capture an image of a filter. The electronic device can determine the particular features or capabilities of the filter using any suitable approach, including for example based on the size, shape or appearance of the filter (e.g., the color of the filter, or the manner in which the filter reflects light), information embedded on the filter (e.g., text describing the filter capabilities etched on the filter), a barcode embedded on the filter, or combinations of these.

In some embodiments, the electronic device can instead or in addition determine the capabilities of the filter from a communication occurring over a communications link established between the electronic device and the filter. For example, one or both of the electronic device and the filter can include a RFID tag and a RFID reader, such that the electronic device and filter can detect each other's presence. The RFID tag can include any suitable information, including for example a code or other content describing the obfuscating or un-obfuscating capabilities of the electronic device and filter, respectively. As another example, one or both of the electronic device and filter can include a tag broadcast or receivable over a Bluetooth or WiFi protocol, or over any other NFC protocol.

The electronic device can support any suitable number of filters simultaneously. For example, if the device detects several filters in its vicinity (e.g., in the viewing angle of a device camera), or if several users authenticate to the user, the electronic device can simultaneously display different information obfuscated in different manners. For example, the electronic device can display different information in consecutive frames provided by the display. As another example, the electronic device can display different information in a single display, where different sections of the display are obfuscated using different approaches (e.g., split the display into two regions, each obfuscated in a manner associated with a particular filter or user).

Figure 6:
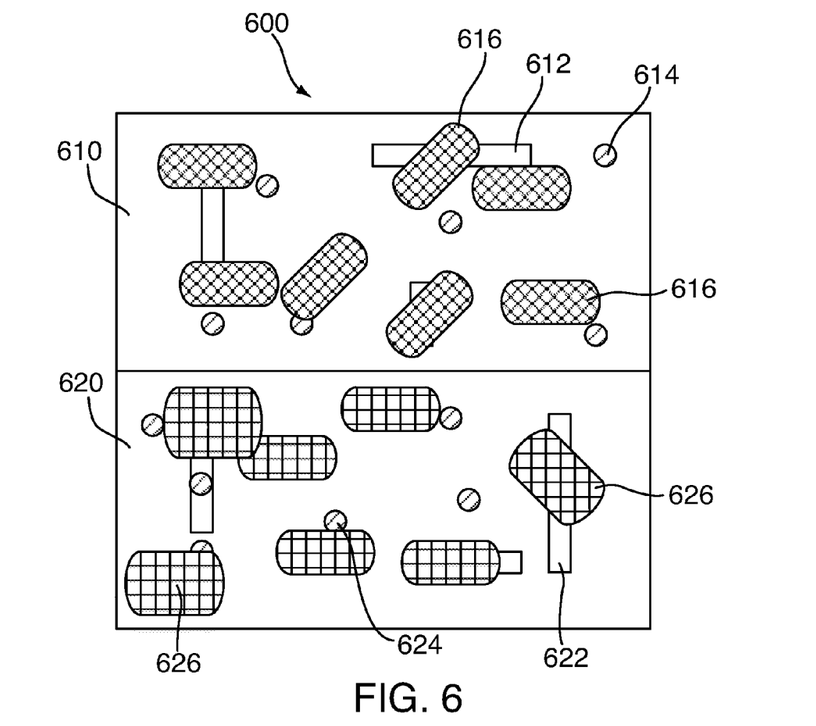
FIG. 6 is a schematic view of an illustrative display having two distinct regions obfuscated in different manners in accordance with one embodiment of the invention.

FIG. 6 is a schematic view of an illustrative display having two distinct regions obfuscated in different manners in accordance with one embodiment of the invention. Display 600 can include first region 610 and second region 620, where information is displayed in each region. In some embodiments, the particular information displayed in each of the regions can be different, and associated with different users of the device. For example, regions 610 and 620 can each be associated with hide users' battleship boards in a battleship game, where each board includes ships 612 and 622, respectively, and shot markers 614 and 624, respectively.

To obfuscate the other user's region from view, while allowing a user to view his own region (e.g., not view his opponent's board but view his own board), each region can be obfuscated using different approaches, where the obfuscation of each region can be removed using a filter used by the user of the region. In the example of FIG. 6, region 610 can be obfuscated by elements 616, while region 620 can be obfuscated by elements 626. Although elements 616 and 626 are shown to be discreet elements, it will be understood that any suitable approach can be used to obfuscate the regions of display 600, including for example adding discrete elements to a display, changing display characteristics of the display (e.g., refresh rate, color spectrum, or polarity), or combinations of these. Using an appropriate filter, each user can view his region of display 600 without the elements 616 or 626, and thus view the underlying information, but may not be able to view the underlying information in the other region of the display. This can ensure privacy in a multi-user environment.

The electronic device display can include any suitable number of regions disposed in any suitable manner. The number of regions can be selected using any suitable criteria, including for example the number of filters detected or the number of users requesting information from the device. The size of the regions can be the same or different, and include any suitable shape (e.g., polygonal, curved, or having holes). In some embodiments, some or all of the regions can overlap. For example, two regions having common information can overlap in a region that includes the common information. The electronic device can obfuscate the common region using an approach that is un-obfuscated by the filters associated with each of the overlapping regions. As another example, two regions having different information can overlap by providing the different information in different displayed frames (e.g., every other frame in a display area is associated with a different region). The filters of each user can prevent the users from viewing unauthorized un-obfuscated frames.

In some embodiments, other approaches can be used to restrict the display of information to specific users. In one approach, the viewing angle of a display can be adjusted (e.g., dynamically) based on the position of a user relative to the display. This approach can allow several users to each view confidential information simultaneously without requiring users to be aligned with the center of the display.

Figure 7:
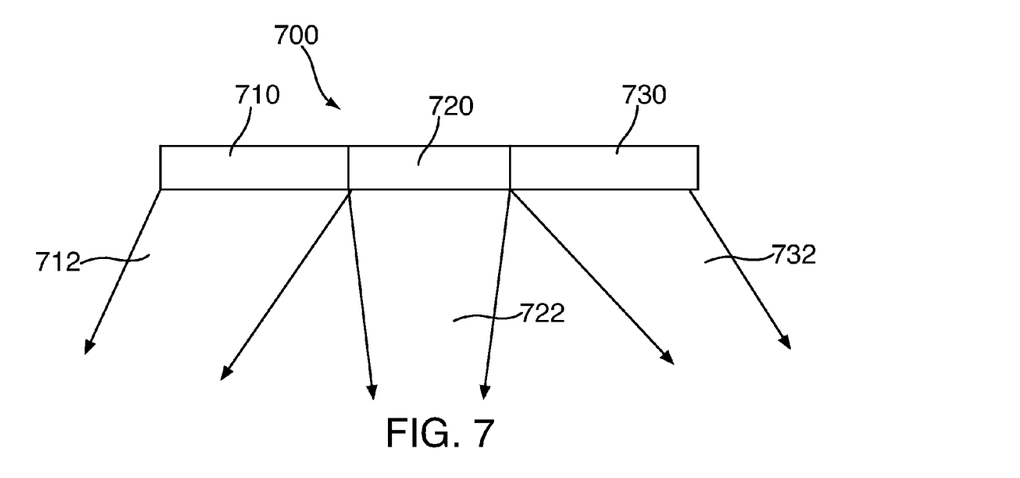
FIG. 7 is a top view of an illustrative display having different viewing angles in different regions in accordance with one embodiment of the invention.

The electronic device can adjust the viewing angle at which particular information is displayed using any suitable approach. In some embodiments, the electronic device can include a dynamic display having a treatment allowing different regions of the display to direct a display output at a particular viewing angle. For example, the display can include a treatment changing the refraction index of particular regions of the display. FIG. 7 is a top view of an illustrative display having different viewing angles in different regions in accordance with one embodiment of the invention. Display 700 can include distinct regions 710, 720 and 730. Although display 700 shows only three regions, it will be understood that the electronic device display can include any suitable number of regions disposed in any suitable manner. The number of regions can be selected using any suitable criteria, including for example the number of users requesting information from the device. The size of the regions can be the same or different, and include any suitable shape (e.g., polygonal, curved, or having holes). In some embodiments, several regions can extend from different heights within the display. Alternatively or in addition, the display can include space between adjacent regions in which no information is provided for either region. This free space can help ensure that information provided in a first region is not visible to a user viewing the device from a field of view associated with a second region.

In some embodiments, some or all of the regions can overlap. For example, different information can be displayed by successive frames within a single area of the display. To ensure that the displayed information is appropriately directed to the users, the display can dynamically change the viewing angle of the display for each frame. For example, the display can change the viewing angle for a first frame to an area left of the display, while the viewing angle for a second frame having information associated with a different user than the first frame can be directed to an area right of the display. The display can synchronize the viewing angle of the display with the frame rate of displayed information, the refresh rate of the device or other display characteristics to ensure that the display routes the displayed information to the proper viewing angle.

Using the approach of FIG. 7, several users can view and interact with different content simultaneously. In particular, each of the several users can position themselves within respective fields of view 712, 722 and 732 to view the information in corresponding regions 710, 720 and 730.

In some embodiments, a user can move relative to the display as the user uses the electronic device. To assist a user in viewing displayed information even when the user changes orientations relative to the display, the electronic device can track the position of the user's head or eyes. When the electronic device determines that the user's head or eye position has changed, the electronic device can direct the display to dynamically adjust the orientation of the field of view to reflect the new detected position of the user. This approach can be particularly useful if a single user is viewing information on the device. In particular, the device can adjust the viewing angle for the entire display, no matter the orientation of the user's head relative to the display.

If several users are viewing information on the device simultaneously, the electronic device can first determine whether a user is entering a field of view associated with another user. For example, the electronic device can determine whether the user whose head position was initially within field of view 712 has moved and encroached on field of view 722. If the electronic device determines that the user's position is only approaching another field of view without encroaching on it, the device can adjust the user's field of view. If, on the other hand, the electronic device instead determines that the user's position is encroaching on another user's field of view, the electronic device can limit the new field of view of the user. In some cases, the device can instead or in addition stop displaying restricted or confidential information in the encroached field of view, and indicate the encroachment to the users of the device. The user whose field of view was encroached (e.g., the user associated with field of view 722) can then elect to ignore the encroachment, or wait for the other user to leave the field of view.

The electronic device can secure the display of any suitable information using one or more of the approaches described above (e.g., combine a obfuscation-type approach with a field of view-type approach). In some embodiments, the electronic device can secure the display of particular types of information. For example, the electronic device can secure the display of user names and passwords, or content accessed once a user name and password have been provided. Such information can include, for example, financial records, communications records (e.g., email and text messages), utilities accounts, message board postings, or combinations of these. In some embodiments, the electronic device can instead or in addition secure the display of particular applications. For example, word processing, image processing, media processing, browsing, time management, calendar, contact applications, or combinations of these can be secured. In some embodiments, only some portions of these applications can be secured (e.g., only secure text documents that are stored in a particular location, or that have specific tags).

The electronic device can secure any suitable portion of the display. For example, the electronic device can obfuscate the display of only information marked as private by a user. As another example, the electronic device can obfuscate the entire display, or entire regions of the display when confidential or private information is displayed in part of the display. This approach can prevent unauthorized users from determining or guessing the displayed private information, for example based on the context provided by the un-obfuscated portions of the display.

The electronic device can determine which information or which portions of a display to secure using any suitable approach. In some embodiments, a user can define specific information to keep private or secure, and a manner to secure it. For example, a user can select to obfuscate an entire display or region of a display for more private information, but only the information itself for less private information. In some embodiments, the electronic device can instead or in addition include one or more default settings for determining which information to obfuscate. As another example, individual applications, or metadata associated with individual content can specify the manner in which displayed information is to be obfuscated.

In some embodiments, a user can direct the electronic device to store and save private or confidential information in an obfuscated form. For example, the user can direct the electronic device to store a transformed version of a document (e.g., as opposed to a non-transformed version with the required transformation information stored as metadata). This approach can prevent unauthorized users from circumventing the obfuscation, as the device may only be able to display the obfuscated version of the information.

In some embodiments, using some obfuscation approaches can provide other advantages for the device. For example, if obfuscation occurs by adjusting the color of displayed information, the obfuscation can favor the use of green and disfavor the user of red. This may increase the lifespan of a OLED display, as a green OLED can last longer than a red OLD. As another example, if the obfuscation lowers the range of color of displayed information, the electronic device can stop displaying black or dark colors. In particular, since those colors won't be visible through a counter-acting filter, power can be saved by not driving dark regions of the display. As still another example, an obfuscation can be monochromatic and help reduce power requirements for the device.

Figure 8:
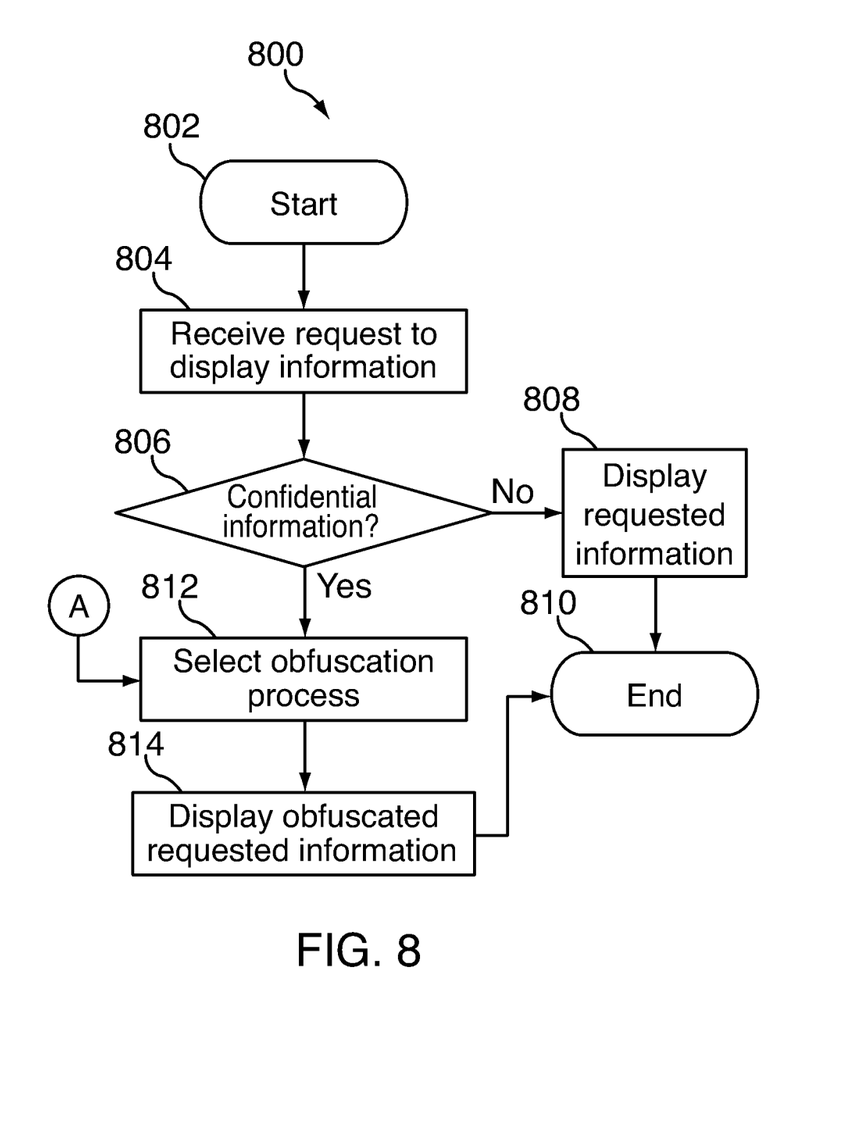
FIG. 8 is a flowchart of an illustrative process for obfuscating a display in accordance with one embodiment of the invention.

FIG. 8 is a flowchart of an illustrative process for obfuscating a display in accordance with one embodiment of the invention. Process 800 can begin at step 802. At step 804, an electronic device can receive a request to display information. For example, the electronic device can receive an input from a user directing the device to display information (e.g., a document or an application). As another example, the electronic device can automatically determine that information should be displayed (e.g., based on the time of day and the identity of a user operating the device). At step 806, the electronic device can determine whether the information is confidential. For example, the electronic device can determine whether the information is marked as being private for a particular user. As another example, the electronic device can determine whether the application providing the information is a private or confidential application. If the electronic device determines that the information is not confidential, process 800 can move to step 808. At step 808, the electronic device can display the requested information. For example, the electronic device can provide the requested information on a display available to the user and any user. Process 800 can then end at step 810.

If, at step 806, the electronic device instead determines that the information is confidential, process 800 can move to step 812. At step 812, the electronic device can select an obfuscation process for displaying the information. For example, the electronic device can select an obfuscation process associated with the information, or associated with the user requesting the information. As another example, the electronic device can select an obfuscation process based on a detected filter used by the user of the device. At step 814, the electronic device can display the obfuscated requested information. For example, the electronic device can apply the obfuscation process selected at step 812 to the information requested at step 804. The electronic device can apply any suitable obfuscation process, including for example processes based on modulating color, refresh rate, polarity, or combinations of these. In some embodiments, the confidential information can be stored in an obfuscated manner. In such embodiments, process 800 can skip directly from step 804 to step 814, as the obfuscation is built into the stored information. Process 800 can then move to step 810 and end.

Figure 9A:
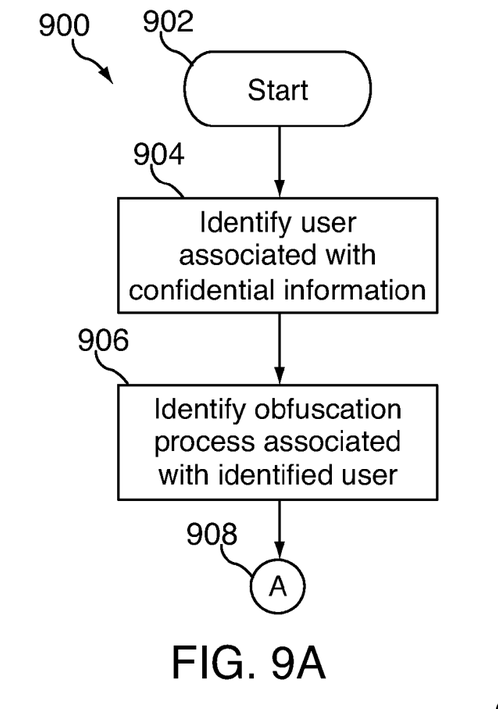
FIG. 9A is a flowchart of an illustrative process for identifying an obfuscation process to apply to confidential information based on a user associated with the confidential information in accordance with one embodiment of the invention.

FIG. 9A is a flowchart of an illustrative process for identifying an obfuscation process to apply to confidential information based on a user associated with the confidential information in accordance with one embodiment of the invention. Process 900 can begin at step 902. In some embodiments, step 902 can occur between steps 806 and 812 of process 800 (FIG. 8). At step 904, the electronic device can identify a user associated with the confidential information. For example, the electronic device can determine, from provided authentication information, the current user of the device. As another example, the electronic device can retrieve a user identity associated with the particular requested information (e.g., the identity of the user that generated the information, or the identity of users authorized to view the information). If the device determines that several users are associated with the information, the electronic device can prompt the user to select one of the users (e.g., provide authentication information associated with one of the users).

At step 906, the electronic device can identify an obfuscation process associated with the identified user. For example, the electronic device can retrieve from storage one or more obfuscation processes or methods associated with the identified user. The processes or methods can be associated with the user at any suitable time, including for example as part of a setup step (e.g., when the user initially provides information regarding a filter owned by the user to the device). Process 900 can then move to step 908, which can correspond to step 812 of process 800.

Figure 9B:
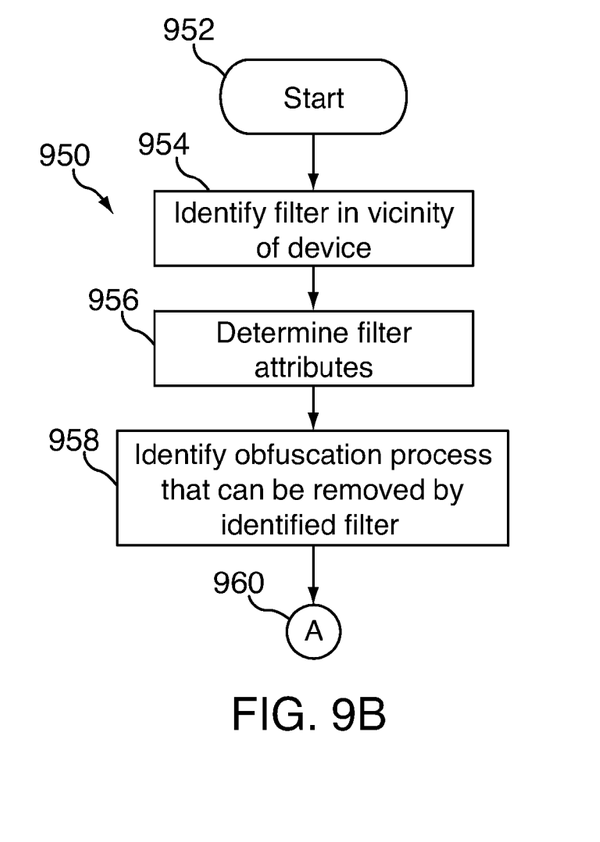
FIG. 9B is a flowchart of an illustrative process for identifying an obfuscation process to apply to confidential information based on detected filters in accordance with one embodiment of the invention.

FIG. 9B is a flowchart of an illustrative process for identifying an obfuscation process to apply to confidential information based on detected filters in accordance with one embodiment of the invention. Process 950 can begin at step 952. In some embodiments, step 952 can occur between steps 806 and 812 of process 800 (FIG. 8). At step 954, the electronic device can identify a filter located in the vicinity of the device. For example, the electronic device can use a camera or other sensor to capture an image of a filter placed opposite the display (e.g., aligned with the display). As another example, the electronic device can detect a filter using a communications network. In particular, the filter can broadcast a signal (e.g., using RFID, Bluetooth, or WiFi) that the electronic device can detect. At step 956, the electronic device can determines attributes of the identified filter. For example, the electronic device can compare the identified filter with a library of filter attributes (e.g., where each filter and its corresponding attributes is catalogued). In some embodiments, the electronic device can receive from the filter an indication of the filter's attributes. For example, the electronic device can detect a bar code or text etched on the surface of the filter describing the attributes of the filter. As another example, the electronic device can receive a communication from the filter indicating the filter attributes (e.g., receive a code describing filter attributes).

At step 958, the electronic device can identify an obfuscation process that can be removed by the identified filter. For example, the electronic device can retrieve from storage one or more obfuscation processes or methods associated with the determined filter attributes.

In some embodiments, the electronic device can instead or in addition receive from the filter an indication of an obfuscation process corresponding to the filter (e.g., a process that can be reversed or removed by the filter). This approach can allow process 950 to skip from step 954 to step 958. Process 950 can then move to step 960, which can correspond to step 812 of process 800.

Figure 10:
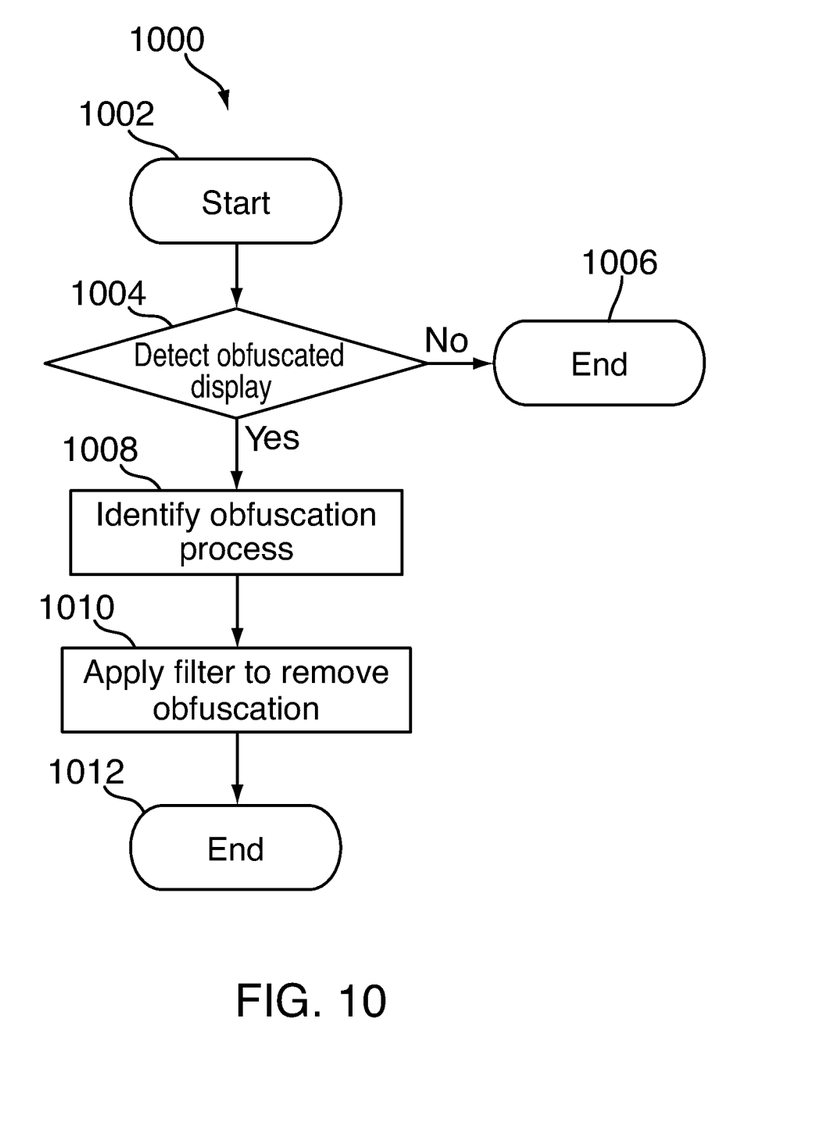
FIG. 10 if a flowchart of an illustrative process for removing an obfuscation in accordance with one embodiment of the invention.

FIG. 10 if a flowchart of an illustrative process for removing an obfuscation in accordance with one embodiment of the invention. Process 1000 can begin at step 1002. At step 1004, a user or filter can determine whether an obfuscated display provided by an electronic device was detected. For example, a user can determine whether a display is obfuscated and the information provided on the display is unintelligible. If the user or filter determines that the detected display is not obfuscated, process 1000 can move to step 1006 and end. If, at step 1004, the electronic device instead determines that the detected display obfuscated, process 1000 can move to step 1008. At step 1008, the user or the filter can identify an obfuscation process used. For example, the filter can receive a communication from the device describing the obfuscation process. As another example, the filter can detect information (e.g., a code) on the obfuscated display identifying the obfuscation process. At step 1010, the filter can be applied to remove the obfuscation. For example, a dynamic filter can be adjusted to remove the obfuscation. As another example, the user can select a particular type of filter that corresponds to the identified obfuscation. Process 1000 can then end at step 1006.

Figure 11:
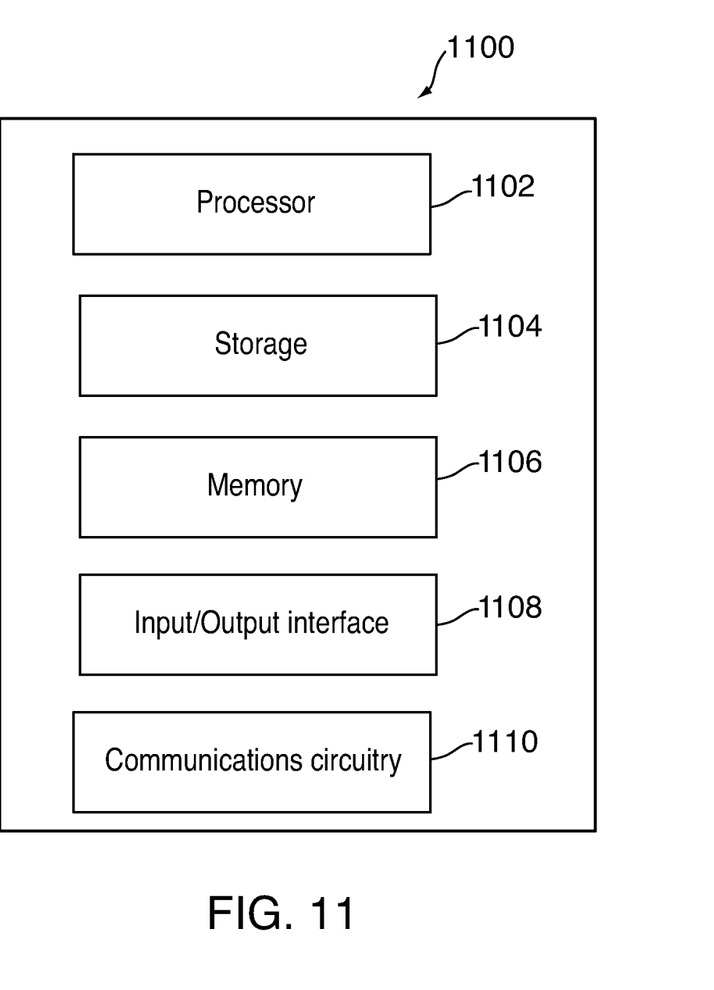
FIG. 11 is a schematic view of an illustrative electronic device for playing back media in accordance with one embodiment of the invention.

The electronic device can include any suitable combination of hardware, firmware and software for providing obfuscated displays. FIG. 11 is a schematic view of an illustrative electronic device for displaying information in accordance with one embodiment of the invention. Electronic device 1100 can include any suitable type of electronic device operative to display content to a user. For example, electronic device 1100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a desktop computer, a music recorder, a video recorder, a camera, radios, medical equipment, and any other device capable of playing back media items.

Electronic device 1100 can include a processor or control circuitry 1102, storage 1104, memory 1106 input/output interface 1108, and communications circuitry 1110, as typically found in an electronic device of the type of electronic device 1100, and operative to enable any of the uses expected from an electronic device of the type of electronic device 1100 (e.g., connect to a host device for power or data transfers). In some embodiments, one or more of electronic device components 1100 can be combined or omitted (e.g., combine storage 1104 and memory 1106, or remove communications circuitry 1110), or the device can include several instances of the components shown in FIG. 11. Alternatively or in addition, electronic device 1100 can include other components not combined or included in those shown in FIG. 11. For example, the electronic device can include one or more sensors (e.g., a camera), motion detection components (e.g., an accelerometer or gyroscope), orientation sensing components (e.g., a magnetometer), positioning circuitry (e.g., GPS circuitry), a tuner, or combinations of these.

Processor 1102 may include any processing circuitry operative to control the operations and performance of electronic device 1100. For example, processor 1102 may be used to run operating system applications, firmware applications, media playback applications, media editing applications, or any other application. In some embodiments, a processor may drive a display and process inputs received from a user interface.

Storage 1104 may include, for example, one or more storage mediums including a hard-drive, solid state drive, flash memory, permanent memory such as ROM, any other suitable type of storage component, or any combination thereof. Storage 1104 may store, for example, media, application data, firmware, user preference information authentication information, lifestyle, exercise, transaction, wireless connection, subscription, contact, or calendar information, and any other suitable data or any combination thereof. Memory 1106 can include cache memory, semi-permanent memory such as RAM, and/or one or more different types of memory used for temporarily storing data. In some embodiments, memory 1106 can also be used for storing data used to operate electronic device applications, or any other type of data that may be stored in storage 1104. In some embodiments, memory 1106 and storage 1104 may be combined as a single storage medium.

Input/output interface 1108 can convert (and encode/decode, if necessary) analog signals and other signals into digital data. For example, input/output interface 1108 may receive and convert physical contact inputs (e.g., from a multi-touch screen or a button press), physical movements (e.g., from a mouse or sensor), analog audio signals (e.g., from a microphone), or any other input provided by a user. Although input/output interface 1108 is illustrated in FIG. 11 as a single component of electronic device 1100, several instances of input/output interface can be included in electronic device 1100.

Electronic device 1100 can include any suitable mechanism, interface, circuitry or component for allowing a user to provide inputs to input/output interface 1108. For example, electronic device 1100 may include a button, keypad, dial, a click wheel, or a touch interface (e.g., a capacitive touch screen), or combination of these. Electronic device 1100 can include specialized output interface associated with output signals such as, for example, one or more audio or visual outputs. An audio output may include one or more speakers (e.g., mono or stereo speakers) built into electronic device 1100, or an audio component that is remotely coupled to electronic device 1100 (e.g., a headset, headphones or earbuds that may be coupled to communications device with a wire or wirelessly). A visual output can include display circuitry (e.g., a screen or projection system) for providing a display visible to the user. For example, the display circuitry can include a screen (e.g., an LCD screen) that is incorporated in electronics device 1100, a movable display or a projecting system for providing a display of content on a surface remote from electronic device 1100 (e.g., a video projector), or combinations of these. In some embodiments, input/output interface 1108 can include a coder/decoder (Codec) to convert digital media data into analog signals such as, for example, video Codecs, audio Codecs, or any other suitable type of Codec.

Communications circuitry 1110 can enable electronic device 1100 to communicate with other devices or with one or more servers using any suitable communications protocol. Electronic device 1100 can include one more instances of communications circuitry for simultaneously performing several communications operations using different communications networks. For example, communications circuitry may support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VOIP), any other communications protocol, or any combination thereof. In some embodiments, communications circuitry 1110 may include one or more communications ports operative to provide a wired communications link between electronic device 1100 and a host device. For example, a portable electronic device may include one or more connectors (e.g., 30 pin connectors or USB connectors) operative to receive a cable coupling the portable electronic device to a host computer. Using software on the host computer (e.g. iTunes available from Apple Inc.), the portable electronic device may communicate with the host computer.

In some embodiments, electronic device 1100 may include a bus operative to provide a data transfer path for transferring data to, from, or between control processor 1102, storage 1104, memory 1106, input/output interface 1108, communications circuitry 1110, and any other component included in the electronic device.

Although many of the embodiments of the present invention are described herein with respect to personal computing devices, it should be understood that the present invention is not limited to personal computing applications, but is generally applicable to other applications. In particular, embodiments of this invention are not limited to media items, but can apply to any content that a user can purchase while connected to a communications network, such as applications that operate on the electronic device, tickets to events or activities, fund transfers between two or more devices, or combinations of these. Using embodiments of this invention, such operations can be conducted while offline from the communications network.

Embodiments of the invention can be preferably implemented by software, but can also be implemented in hardware, firmware, software or a combination thereof. Embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for securing the display of information provided by an electronic device, comprising:
   identifying private information to display, wherein identifying private information to display comprises receiving, from a user, a selection of a region of a display device that includes the identified private information;
   retrieving an obfuscation process associated with the identified private information, wherein the effect of the obfuscation process can be removed by a filter associated with the private information;
   with image processing circuitry in the electronic device, applying the obfuscation process to the region that includes the identified private information to generate an obfuscated display, wherein the private information is not discernable in the obfuscated display;
   with the display device in the electronic device, displaying the obfuscated display, wherein applying the obfuscation further comprises at least one of:
      rotating the identified private information about at least one point;
      spatially distorting the identified private information;
      scaling the identified private information;
      reflecting the identified private information; and
      shearing the identified private information; and
   with non-transitory storage in the electronic device, storing the identified private information in its obfuscated form.

2. The method of claim 1, further comprising:
   transmitting information describing the obfuscation process to the filter.

3. The method of claim 1, further comprising:
   transmitting information identifying at least one of a plurality of filters corresponding to the obfuscation process.

4. The method of claim 1, wherein:
   applying the obfuscation process further comprises overlaying at least one artifact on the private information.

5. The method of claim 1, wherein applying the obfuscation further comprises modulating at least one of:
   the color of the display;
   the polarity of the display; and
   the time at which information is provided on the display.

6. The method of claim 1, further comprising:
identifying at least two sets of private information to display, wherein each of the at least two sets of private information is associated with an obfuscation processes;
obfuscating the at least two sets of information using the respective associated obfuscation processes; and
displaying the at least two sets of information in at least two regions of the display.

7. The method of claim 6, wherein:
at least a portion of the two regions of the display overlap.

8. The method of claim 6, further comprising:
the obfuscation processes associated with each of the at least two sets of private information are different.

9. The method of claim 6, further comprising:
displaying one of the at least two sets of data in each image frame provided by the electronic device.

10. The method defined in claim 1 wherein applying the obfuscation comprises rotating the identified private information about a plurality of points.

11. The method defined in claim 1 wherein applying the obfuscation comprises spatially distorting the identified private information.

12. The method defined in claim 1 wherein applying the obfuscation comprises reflecting the identified private information.

13. The method defined in claim 1 wherein applying the obfuscation comprises shearing the identified private information.

14. The method defined in claim 1 further comprising:
tagging one or more documents as containing confidential information;
in response to a request to display a given document, determining if the given document is tagged as containing confidential information; and
whenever the given document is tagged as containing confidential information, applying the obfuscation process to the given document and displaying an obfuscated version of the given document.

15. The method defined in claim 1 further comprising:
identifying at least one storage location in the electronic device as containing confidential information;
in response to a request to display a given document, determining if the given document is stored in the at least one storage location; and
whenever the given document is stored in the at least one storage location in the electronic device, applying the obfuscation process to the given document and displaying an obfuscated version of the given document.

* * * * *